Jan. 6, 1959    H. B. ATWOOD    2,867,076
LUBRICATION OF SPINNING RINGS
Filed May 16, 1957    2 Sheets-Sheet 1
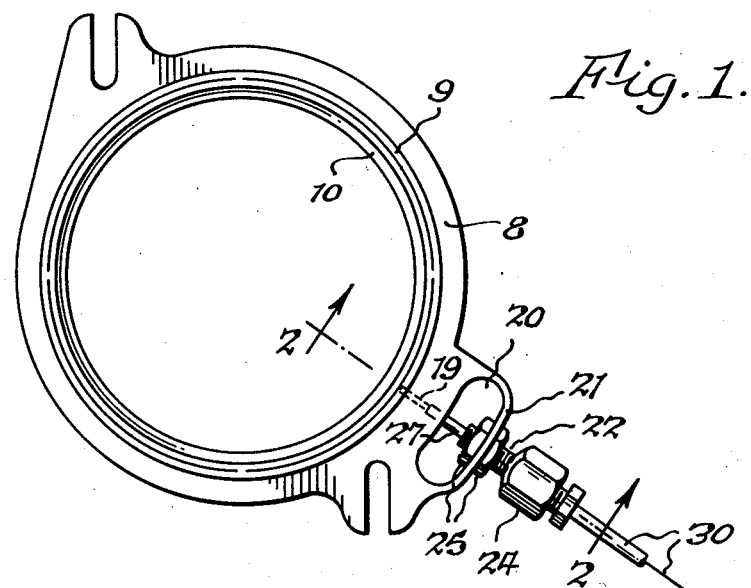
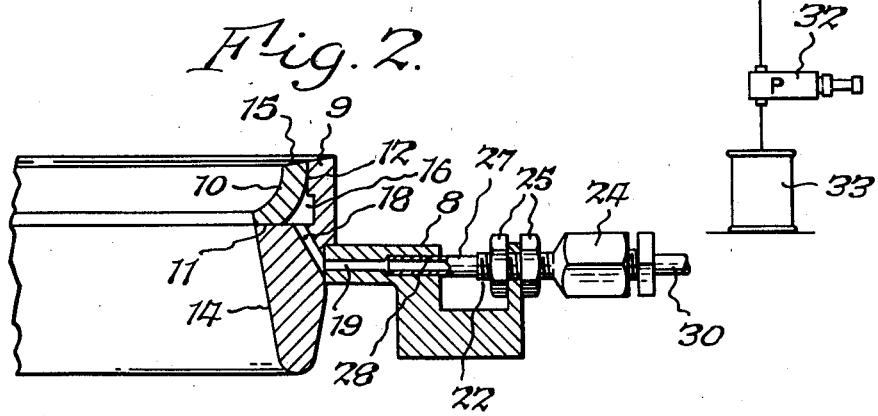
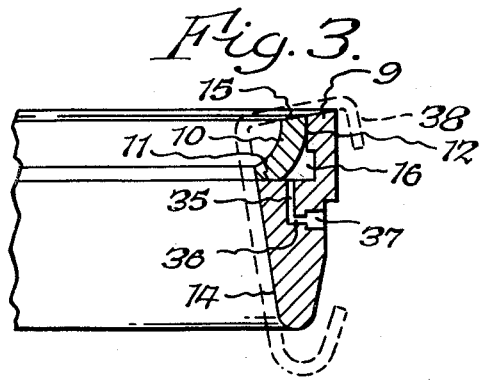
INVENTOR.
Hyatt B. Atwood
BY Parker & Brochmar
Attorneys.

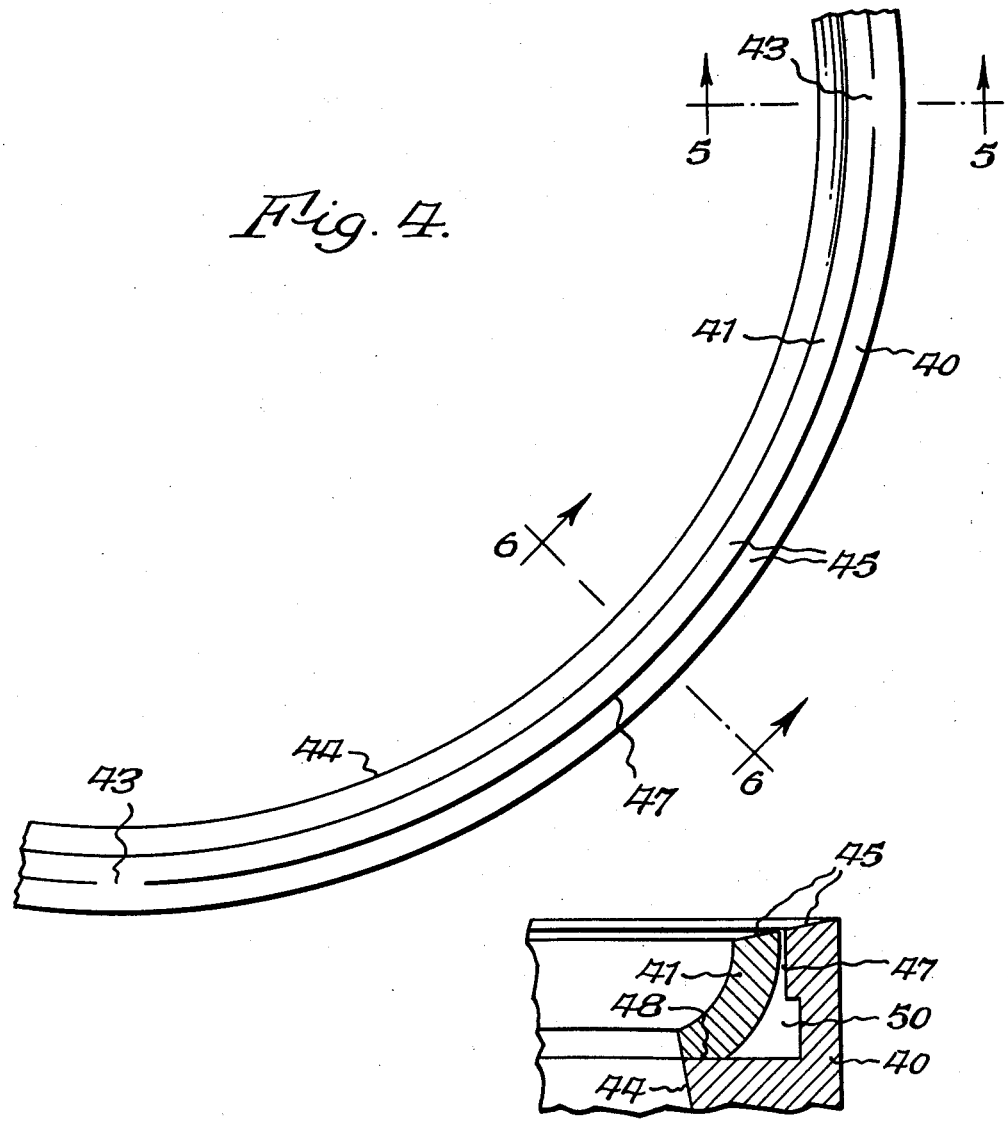

United States Patent Office 2,867,076
Patented Jan. 6, 1959

2,867,076

LUBRICATION OF SPINNING RINGS

Hyatt B. Atwood, Buffalo, N. Y., assignor to Herr Manufacturing Company, Inc., Buffalo, N. Y.

Application May 16, 1957, Serial No. 659,641

8 Claims. (Cl. 57—120)

This invention relates to the art of spinning yarns and more particularly to the supplying of lubricant to the bearing surfaces of rings used on spinning machines.

Spinning rings of this type have heretofore commonly been provided on the surfaces thereof contacted by the traveller with one or more holes or openings in which wicks are arranged which carry lubricant to these surfaces, the traveller being depended upon to spread the lubricant to those parts of the bearing surfaces of the rings spaced from these lubricating holes. In the Fillinger application for patent, Ser. No. 536,084, filed Sept. 23, 1955, these rings were constructed in two parts fitted together and providing between them microscopically thin seams or spaces terminating at the bearing surfaces through which the lubricant passed by capillary action. Wicks were employed to carry the lubricant from a cup or reservoir to these capillary seams or passages.

There have been available for some time on the open market appartus for automatically supplying lubricant intermittently and under pressure to machines or apparatus which require lubricant and I have found that systems of this type are well adapted for use in connection with the lubrication of spinning rings and have substantial advantages over the prior wick-fed systems. The wickfed lubricating devices require frequent replenishing of the lubricant supply for each spinning ring by pouring lubricant into relatively small cups arranged on each ring holder or support, so that this system was dependent on persons to fill each cup at the required time interval. Automatic lubricating systems supplying lubricant intermittently under pressure lend themselves particularly well for use in connection with rings of the type shown in said Fillinger application for patent.

It is consequently one of the objects of this invention to provide a lubricating system for spinning rings by means of which the lubricant is forced to flow under pressure through the seams during those intervals when the pressure is applied to the same and whereby the lubrication of the rings is continued by capillary action during the time that no pressure is applied to the lubricant.

Another object is to provide rings of this type with annular grooves which communicate with the seams and constitute reservoirs for lubricant so that when lubricant is supplied under pressure it serves not only to accelerate the flow of lubricant through the seams, but also fills these grooves or reservoirs with lubricant for continuing the lubrication by capillary action alone when no pressure is applied.

A further object is to provide a spinning ring with an inner ring which forms with the spinning ring capillary seams through which the lubricant may pass and which inner rings are welded at intervals to the main or body portion of the ring in such a manner that the capillary seams are of varying cross section to ensure the passage of lubricant through the seams at all times.

Other objects and advantages will be apparent from the following description of some embodiments of the invention, and the novel features will be particularly pointed out hereinafter in connection with the appended claims.

In the accompanying drawings:

Fig. 1 is a top plan view of a spinning ring provided with lubricating means embodying this invention, this figure also including a diagrammatic representation of a pump or other device for intermitteetly feeding lubricant under pressure to the spinning ring.

Fig. 2 is a fragmentary sectional elvation thereof on line 2—2, Fig. 1.

Fig. 3 is a fragmentary sectional view of a spinning ring of slightly modified construction.

Fig. 4 is a fragmentary greatly enlarged view of a spinning ring having an inner ring welded thereto.

Figs. 5 and 6 are respectively fragmentary, transverse, sectional views thereof on lines 5—5 and 6—6, Fig. 4.

The drawings illustrate by way of example certain embodiments of this invention applied to certain types of spinning rings, but it will be understood that my improved lubricating means and method may be applied to spinning rings of other constructions.

In the construction shown in Figs. 1 and 2, 8 represents a holder for a spinning ring which may be mounted in any usual reciprocating member or support. The spinning ring includes a body portion 9 and an inner ring 10. The body portion 9 is formed so that the exterior surface thereof will accurately fit into the holder 8, and this body portion of the spinning ring is provided on its inner face with an annular recess formed to receive the inner ring 10 in such a manner that between the body portion of the ring and the inner ring 10 there are formed two seams or joints 11 and 12. These seams or joints are so formed that lubricant may pass through the same by capillary action, and the outer portions of these seams or joints terminate in the bearing surfaces of the rings against which the travellers bear. The contacting surfaces of the body portion of the ring and the inner ring may be smooth or they may be slightly fluted, corrugated or knurled if desired. The seam or joint 11 terminates adjacent to the upper portion of a bearing surface 14 and the other seam or joint 12 terminates at an upper bearing surface 15. The body portion and the inner ring are so formed as to produce an annular groove or recess 16 which serves as a reservoir for lubricant.

Lubricant may be supplied to the groove 16 in any suitable manner. For example, in the construction illustrated in Figs. 1 and 2, an aperture or passage 18 extends upwardly at an inclination from the outer surface of the body portion of the spinning ring to the groove 16. The outer end of the passage or hole 18 terminates at the portion of the spinning ring which fits snugly into the holder 8, and the holder is provided with another passage 19 which terminates at the lower end of the hole or passage 18 so that lubricant may pass freely from the passage 19 into the passage 18.

The holder 8 in the particular construction shown is of a type heretofore used in connection with lubricating systems employing wicks and for that purpose the holder has an integrally formed, lubricant-receiving cup 20 having an outer wall 21. These cups lend themselves well to the securing thereto of tube or duct connections for supplying lubricant to the passage 19 of the holder. Consequently, the outer wall 21 of the lubricant cup has a hole formed therein to receive the threaded stem 22 of a plug 24. A pair of nuts 25 cooperate with the threaded portion 22 of the plug to secure this plug firmly to the outer wall 21 of the lubricant cup. The plug is provided with a piece of tubing 27 firmly secured to the plug 24 and extending into an enlarged portion 28 of the hole or passage 19 in the holder, this enlarged portion of the passage forming a shoulder against which the tube 27 may abut to limit the extent to which the tube may enter this passage.

30 represents a supply tube or duct extending into the plug 24 and secured to the plug by any suitable or well known means. The tube 30 is connected with the discharge end of a suitable pump or pressure-applying device 32 diagrammatically shown in Fig. 1, which receives lubricant from a container 33 and pumps the lubricant through the tubes 30 and 27 into the passage 19 for discharge into the annular groove 16 formed between the body portion of the spinning ring and the inner ring 10. The pump 32 may be of any suitable or desired construction and since pumps or pressure-applying devices of this type are well known and can be purchased on the open market, it is not considered necessary to illustrate this pump more in detail. The means for actuating the pump are also not shown since such means also are old and well known and comprise a time-controlled device which operates the pump 32 intermittently for a few strokes at a time. The timing of the operation of the pump may be controlled to supply to the spinning ring the required amount of lubricant.

In the operation of the apparatus described, when the pump applies pressure to the lubricant, the lubricant under pressure will enter the annular groove 16 and force lubricant to flow outwardly through the seams in small quantities thus supplementing the capillary flow of the lubricant. The pump also fills the groove or reservoir 16 with lubricant. When the operation of the pump is stopped, the groove 16 will contain sufficient lubricant so that the spinning ring will be supplied through the capillary seams with lubricant from the annular groove 16 for a considerable period of time.

The supplying of lubricant under pressure to the annular groove 16 also serves to clear the capillary seams 11 and 12 of any foreign material or gum which may have become deposited in the seams and thus ensures the satisfactory lubricant of the spinning ring by capillary action after the pump has temporarily ceased to supply lubricant under pressure to the annular groove 16.

In Fig. 3 I have shown a spinning ring similar to the one shown in Figs. 1 and 2, except that the hole or passage for conducting lubricant to the annular groove 16 is in the form of a downwardly extending hole 35 which connects with a horizontally extending hole 36. The hole 36 terminates in a passage 37 of larger diameter which consequently forms with the passage 36 an annular shoulder which serves to limit the extent to which any tubular, lubricant-conducting member or conduit may be inserted into the spinning ring to avoid shutting off the supply of lubricant to the upright hole or passage 35. This view also shows a traveller 38 of the type commonly used in connection with spinning rings of this kind.

The inner ring may be secured to the body portion 9 of the spinning ring in any suitable or desired manner, for example, by means of a tight fit or by peening the inner ring, as illustrated in the aforesaid application for patent. I have found, however, that very excellent results may be obtained if the inner ring is spot welded to the body portion of the spinning ring, as illustrated in Figs. 4–6. In this construction the body portion 40 of the spinning ring may be formed in the same manner as described in connection with Figs. 1–3 and the inner ring 41 may be spot welded to the body portion 40 of the spinning ring at intervals about the spinning ring. For example, the upper portion of the inner ring may be spot welded at 43 to the inner ring at places approximately 90° apart.

In the manufacture of these rings sufficient pressure is applied at the points where the welds are to be made which urges the inner ring into tight contact with the body portion of the spinning ring in order to permit a welding current to pass at these points between the inner ring and body portion which forms the spot welded portions 43. After the spot welding has been accomplished, the ring is machined and also heat-treated and the bearing surfaces 44 and 45 are accurately and smoothly ground with the result that after these various steps in the manufacture have been effected, the inner ring 41 will no longer be truly concentric with the body portion 40 of the spinning ring, which also results in variations in the width of the seam between the parts. For example the portions of the upwardly extending seams between the inner ring 41 and the body portion 40 will be closed at the welds and very small at the portions thereof adjacent to the welds, but will increase in size at portions thereof between the welds. I have illustrated this enlargement of the seams at 47 in Figs. 4 and 6, but it will be understood that this illustration is greatly exaggerated to permit illustration in the drawings. The difference in the width of the seam at portions adjacent to the welds and at portions midway between the welds is microscopic but is sufficient to permit a larger amount of lubricant to pass through the seams intermediate of the welds when pressure is applied to the lubricant. These enlarged portions of the seams are not however sufficiently enlarged to prevent the lubricant from passing out through the same by capillary action.

The main distortion of the inner ring due to welding or other manufacturing processes affects chiefly the seam leading to the upper bearing surface 45, but the distortion of the upper portion of the inner ring also results in slight distortion of the lower portion thereof at the seam 48 which, however, is not illustrated.

When the lubricant under pressure is supplied to the annular groove 50 in the ring, the flow of lubricant under pressure will be greatest at the largest openings 47 of the seam and will gradually decrease in volume toward the welds 43. This unequal distribution of lubricant is rapidly evened out by the travellers which carry the excess lubricant to all parts of the bearing surface 45. Any excess lubricant may also flow downwardly from the lower edge of the bearing surface 45 and eventually pass along the inner surface of the ring 41 to the bearing surface 44. The enlargement 47 of the seam assures a very efficient and reliable lubrication of the spinning ring both when the flow of lubricant is accelerated by pressure and also when the flow of lubricant is by capillary action only. A similar action also takes place at the lower seam 48 which lubricates the bearing surface 44.

By making the capillary seams of greater width at portions thereof than at other portions, a better control of the flow of lubricant to the bearing surfaces may be obtained, particularly when these spinning rings are manufactured in quantities.

While this intermittently operating, lubricating mechanism herein described has been found very satisfactory yet it is also possible to supply the lubricant in atomized or mist form in a current of air, either intermittently or continuously. The spinning ring shown operates in a very satisfactory manner with such air currents carrying a mist of lubricant, since a certain portion of the entrained lubricant will be condensed or deposited on interior surfaces of the ring and in the grooves 16 or 50, so that the bearing surfaces of the rings will be lubricated by capillary action of the condensed lubricant, as well as by pressure of the air carrying the atomized lubricant.

It will be understood that various changes in the details, materials and arrangements of parts which have been herein described and illustrated in order to explain the nature of the invention, may be made by those skilled in the art, within the principle and scope of the invention as expressed in the appended claims.

I claim:

1. A method of lubricating the traveller engaging surfaces of spinning rings of the type having a capillary passage terminating at a bearing surface of the ring and through which lubricant may pass, which includes the step of supplying lubricant under pressure to said capillary passage at intervals of time and continuing the supplying of lubricant through said passage by capillary action when the pressure is interrupted.

2. A method of lubricating the traveller engaging surfaces of spinning rings of the type having a capillary passage terminating at a bearing surface of the ring and through which lubricant may pass, and having an annular groove within said ring which forms a reservoir for lubricant and from which lubricant passes to said capillary passage, which includes the step of supplying lubricant under pressure to said groove at intervals of time to force lubricant through said capillary passage and supply lubricant to said passage, and then supplying lubricant by capillary action through said passage when the pressure is interrupted.

3. A method of lubricating the traveller engaging surfaces of spinning rings of the type including a body portion and an inner ring fitted into said body portion and forming therewith an annular groove for lubricant and a seam through which lubricant can pass from said groove to a bearing surface by capillary action, the step of supplying a charge of lubricant under pressure to said annular groove for forcing lubricant through said seam to said bearing surface and simultaneously filling said annular groove with lubricant, and continuing the lubrication of said bearing surface by capillary action through said seam.

4. Lubricating means for a spinning ring having a bearing surface cooperating with a traveller, said spinning ring comprising a body part and an inner ring seating in said body part and forming therewith an annular passage of capillary size terminating at said bearing surface, and means operating at intervals of time and supplying lubricant under pressure to said passage.

5. Lubricating means for a spinning ring having a bearing surface cooperating with a traveller, said spinning ring comprising a body portion and an inner ring seating in said body portion and secured thereto and forming therewith a passage of capillary size terminating at said bearing surface, that improvement which includes means for supplying lubricant at a pressure greater than atmospheric to said passage at intervals of time, and a storage space in said ring to which said supply means feed lubricant to be passed by capillary action through said seam when no lubricant is being supplied to said ring.

6. Lubricating means for a spinning ring having a bearing surface cooperating with a traveller, said spinning ring comprising a body portion and an inner ring seating in said body portion and secured thereto and forming therewith a passage of capillary size terminating at said bearing surface, said passage being of greater width at intervals than at the portions thereof at which said inner ring is secured to said body portion, and means for supplying lubricant to said passage.

7. Lubricating means for a spinning ring having a bearing surface cooperating with a traveller, said spinning ring comprising a body portion and an inner ring seating in said body portion and secured thereto and forming therewith a passage of capillary size terminating at said bearing surface, said passage being of annular form and having portions thereof of greater width than other portions, and means for intermittantly supplying lubricant under pressure to said passage.

8. A spinning ring having a bearing surface for a traveller and formed of a body portion and an inner ring forming between them a seam through which lubricant can pass by capillary action, said seam terminating at said bearing surface, said inner ring being spot welded at a plurality of points at said seam to said body portion, said inner ring being distorted to form portions of said seam of greater width in the spaces between said welded portions, and decreasing in width toward said welded portions, and means for supplying lubricant to said seam.

References Cited in the file of this patent

UNITED STATES PATENTS

| | | |
|---|---|---|
| 2,005,766 | Wright | June 25, 1935 |
| 2,435,939 | Herr | Feb. 10, 1948 |
| 2,470,736 | Atwood et al. | May 17, 1949 |